UNITED STATES PATENT OFFICE.

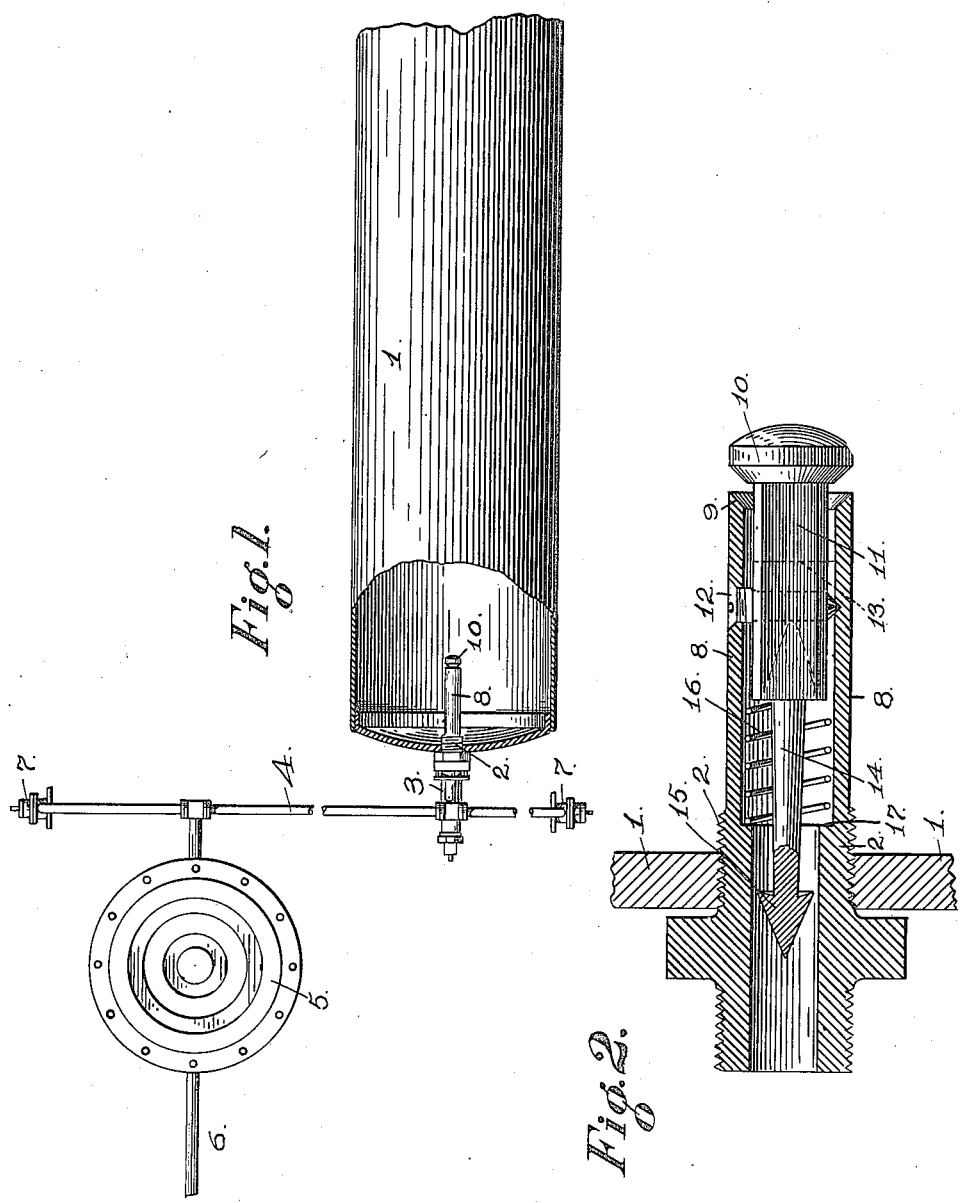

HARRY D. DONNELL, OF BERKELEY, CALIFORNIA, ASSIGNOR TO THE SAFETY CAR HEATING AND LIGHTING CO., OF NEW YORK, N. Y., A CORPORATION OF NEW JERSEY.

GAS-SUPPLY SYSTEM.

961,745.

Specification of Letters Patent. Patented June 14, 1910.

Application filed July 13, 1908. Serial No. 443,230.

*To all whom it may concern:*

Be it known that I, HARRY D. DONNELL, a citizen of the United States, residing at Berkeley, in the county of Alameda and State of California, have invented certain new and useful Improvements in Gas-Supply Systems, of which the following is a specification.

My invention relates to gas-supply systems for lighting, heating, cooking or other purposes, in which gas under pressure is stored in a holder or reservoir, and is thence conveyed through an outlet pipe and a pressure regulator to the pipes which lead it to the points of consumption; a familiar example of such systems being found in the apparatus for the lighting of railway cars.

It is to such a system that my invention is especially applicable, the object being to provide a simple and effective automatically operating means for shutting off the gas from the holder in case the outlet connections between the holder and regulator be broken, as, for example in a wreck, or otherwise.

My invention consists, in connection with the gas-holder, outlet pipe, pressure regulator and supply pipes to the lamps or burners, of such a gas supply system, of a valve exposed to the gas-pressure of the holder; said valve being inoperative under the normal flow to the lamps or burners but operative to automatically shut off the flow from the holder in case of a break in the outlet pipe, between the holder and regulator, as I shall now fully describe, by reference to the accompanying drawings in which:—

Figure 1 is a general view partly broken, of my improved gas-supply system. Fig. 2 is a longitudinal section, enlarged, of the safety valve.

1 is the holder or tank in which the gas is stored, under pressure.

2 is an outlet bushing fitted in the end of the holder, and having connected with its outer end, the holder valve 3, from which extends the outlet pipe 4 to the pressure regulator 5. From this regulator the pipe 6 leads to the lamps or burners.

7 indicates the filling valves. These are all familiar parts of a gas-supply system, such, for example, as is used in lighting railway cars.

In my improvement, I extend or lengthen the inner end of the outlet bushing 2, as shown at 8, and form in the extremity of this extension a seat 9, for a valve 10. The stem 11 of this valve plays and is guided freely within the extension 8, and is limited by a screw 12, passing through the extension into an elongated slot 13 in said stem. The stem 11 is continued as a spindle extension 14, which terminates in a resistance shoulder 15, best made in the form of a cone, the base of which is slightly dished. A light spring 16 may be placed around the spindle extension 14 of the stem, one end bearing on the enlarged portion of the stem 11, and the other resting on a ledge 17 on the inner surface of the bushing 2. The effect of the spring is to insure the valve being normally held open. This spring is not essential, however, for the reason that as the valve 10 is within the holder 1 and is therefore exposed on all sides to the gas pressure therein, it is balanced, and will be loose and free enough even without the spring to not interfere with the flow of the gas under normal conditions; nor will the valve 10 be affected by the normal flow of the gas to the lamps or burners, for in these systems, the regulator is so set that the pressure on the burner side of the regulator is only a few ounces, while in the holder and its connections on the pressure side of said regulator the pressure is very great. But in case of a break in these connections between the holder and the regulator, the gas rushing past the valve 10, and encountering the resistance shoulder 15 of the stem-extension will, by its velocity, exert sufficient pressure thereon to pull the valve 10 to its seat, and thus automatically cut off the escape of the gas. The valve 10 being within the holder is well protected.

Having thus described my invention, what I claim as new and desire to secure by Letters Patent is:—

1. In a gas-supply system, the combination of a holder for gas under pressure, an outlet pipe therefrom; a regulator in connection with said outlet pipe, to reduce the pressure; an outlet from said regulator to the point of gas consumption; a bushing fitted into the holder, and connecting exteriorly with the outlet pipe said bushing extending into the holder; a valve exposed within the holder, coacting with the inner end of the bushing and open under the normal flow of the gas through the regulator, said valve having a stem playing in the bushing; and a resistance shoulder on said stem within the bushing to effect the seating of the valve against the inner end of the bushing in case of a break in the outlet pipe between the holder and regulator.

2. In a gas-supply system, and in combination with the holder containing the gas under pressure, and the outlet connection therefrom, having an extension projecting into the holder with a valve seat at its inner end, a normally-open valve arranged to seat upon and close the inner end of said outlet connection within the holder, said valve having a stem playing in said connection, and a resistance shoulder on said stem within said connection, adapted under the velocity of the escaping gas, in case of a break in said outlet connection, to pull said valve to its seat.

In testimony whereof I have signed my name to this specification in the presence of two subscribing witnesses.

HARRY D. DONNELL.

Witnesses:
WM. F. BOOTH,
D. B. RICHARDS.